United States Patent [19]

Iida

[11] Patent Number: 5,788,189

[45] Date of Patent: Aug. 4, 1998

[54] SPACECRAFT AND AN ATTITUDE CONTROL METHOD FOR A SPACECRAFT

[75] Inventor: Hiroshi Iida, Tokyo, Japan

[73] Assignee: NEC Corporation, Japan

[21] Appl. No.: 661,300

[22] Filed: Jun. 13, 1996

[30] Foreign Application Priority Data

Jun. 15, 1995 [JP] Japan ................. 7-148566

[51] Int. Cl.[6] ................................. B64G 1/24
[52] U.S. Cl. ................................. 244/166; 701/13
[58] Field of Search ................. 244/164, 165, 244/166; 701/13

[56] References Cited

U.S. PATENT DOCUMENTS 5,279,483  1/1994  Blancke et al. .................. 244/165
5,540,405  7/1996  Bender et al. .................. 244/166

FOREIGN PATENT DOCUMENTS

62-58960  12/1987  Japan.

*Primary Examiner*—Galen L. Barefoot
*Attorney, Agent, or Firm*—Ostrolenk, Faber, Gerb & Soffen, LLP

[57] ABSTRACT

A spacecraft is provided which has an environmental disturbance torque filter that predicts the environmental disturbance torque acting on the spacecraft, and an unloading control section 5 which establishes, from the predicted environmental disturbance torque 4 and the angular momentum residual 2, a magnetic moment to be generated, by considering the environmental disturbance torque, thereby providing a reduction in magnetic unloading power consumption and a reduction in the size and weight of related hardware.

19 Claims, 5 Drawing Sheets

VARIATION IN ANGULAR MOMENTUM RESIDUAL (ONE DAY)
(X: X-AXIS DIRECTION, Y: Y-AXIS DIRECTION, Z: Z-AXIS DIRECTION)

Fig. 2(B)

ACCUMULATED VALUE OF POWER CONSUMPTION INDEX (=QUANTITY PROPORTIONAL TO THE POWER CONSUMPTION) (ONE DAY)
(X: X-AXIS DIRECTION, Y: Y-AXIS DIRECTION, Z: Z-AXIS DIRECTION, TOTAL: TOTAL VALUE FOR X, Y AND Z DIRECTIONS)

VARIATION IN ANGULAR MOMENTUM RESIDUAL (ONE DAY)

(X: X-AXIS DIRECTION, Y: Y-AXIS DIRECTION, Z: Z-AXIS DIRECTION)

Fig.5(B)

ACCUMULATED VALUE OF POWER CONSUMPTION INDEX (=QUANTITY PROPORTIONAL TO THE POWER CONSUMPTION) (ONE DAY)

(X: X-AXIS DIRECTION, Y: Y-AXIS DIRECTION, Z: Z-AXIS DIRECTION, TOTAL: TOTAL VALUE FOR X,Y AND Z DIRECTIONS)

SPACECRAFT AND AN ATTITUDE CONTROL METHOD FOR A SPACECRAFT

BACKGROUND OF THE INVENTION

1. Field of the Invention

The present invention relates to a spacecraft and an attitude control method for a spacecraft, and more specifically it relates to a spacecraft which has aboard it a magnetic unloading method which uses a torque, known as magnetic torque, which is developed by mutual interaction between the geomagnetic field received by the spacecraft and a magnetic momentum generating means, known as a magnetic torquer, which is mounted aboard the spacecraft, to eliminate a angular momentum residual which is accumulated in an angular momentum accumulator of the spacecraft, and to an attitude control method of a spacecraft aboard which this magnetic unloading method is provided.

2. Description of the Related Art

In the magnetic unloading method used in the past, of the angular momentum residual, while in general it was possible to eliminate an instantaneous component which is perpendicular to the geomagnetic field at each point in time, it was intrinsically impossible to eliminate an instantaneous component which is parallel to the geomagnetic field.

However, because the direction of the geomagnetic field which the spacecraft receives changes as the spacecraft circles in an orbit about the earth, a component of the angular momentum residual which at one point in time is parallel and cannot be eliminated changes at another point to a component which is perpendicular to the geomagnetic field, at which point it can be eliminated.

Therefore, it is possible to eliminate angular momentum residual received by the spacecraft in all directions as it circles in orbit.

Figure 4:
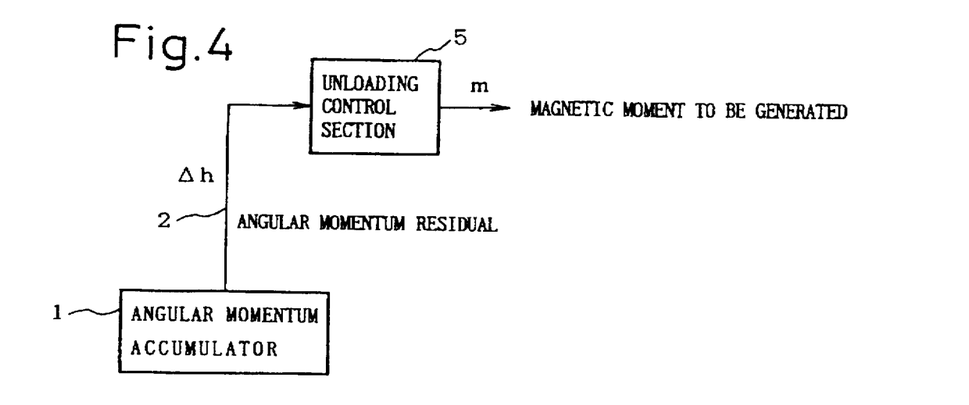
FIG. 4 is a block diagram which shows the magnetic unloading method of the past, which considers only the amount of angular momentum residual.

In the magnetic unloading method of the past, as shown in FIG. 4, only the amount of angular momentum residual 2 (=Δh) from an angular momentum accumulator comprising a wheel or the like is considered, the magnetic momentum m which is to be generated by a magnetic torquer, which is a kind of magnetic moment generating means, mounted aboard the spacecraft, is determined. That is, the amount of magnetic moment ( m) which is to be used, is determined by the unloading control section 5 utilizing, for example, the following equation, as unloading control law.

$$m = K(\Delta h \times B) \quad (1)$$

Figure 5A:
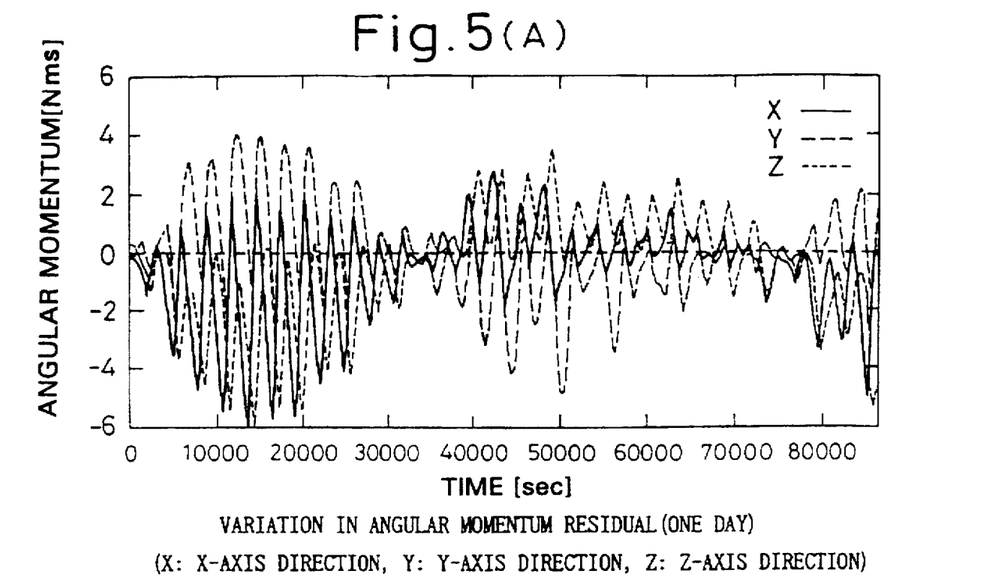
Figure 5B:
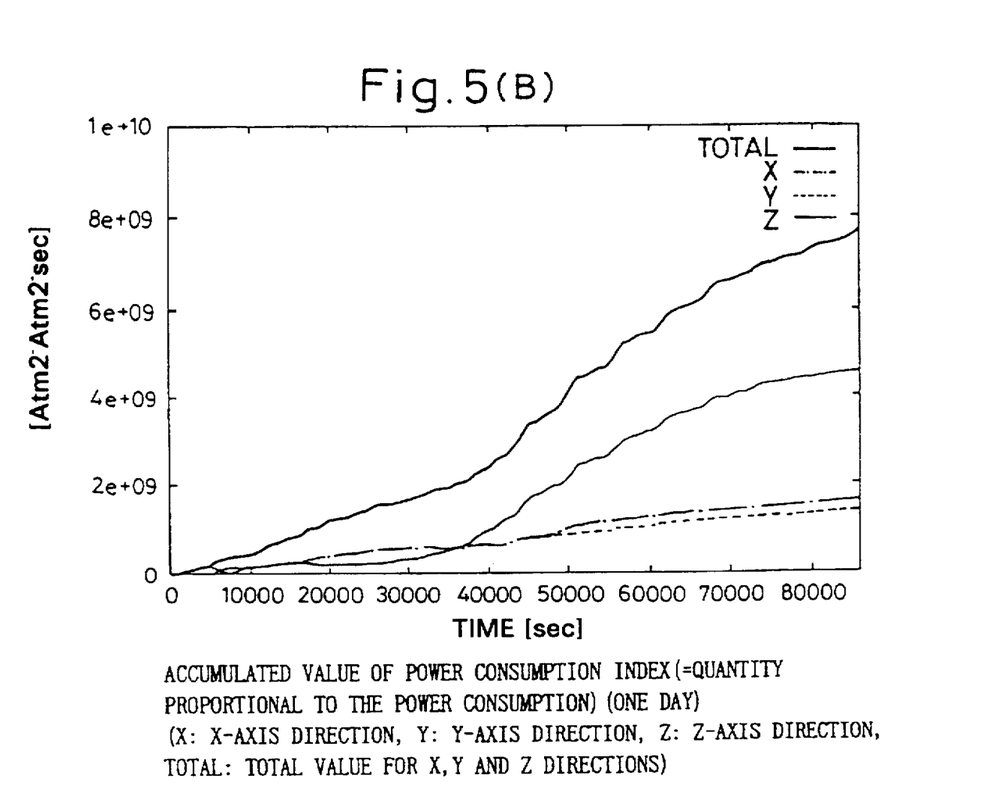

In the above equation, B is the geomagnetic field vector received by the spacecraft, K is a Gay control matrix of constants of proportionality, and the symbol x represents an outer vector product. FIG. 5 shows the operation in the case in which the unloading control quantity according to Equation (1) is applied to a spacecraft, FIG. 5(A) showing the variation in angular momentum residual over one day, and FIG. 5(B) showing the accumulated value of the power consumption index over one day.

Figure 6:
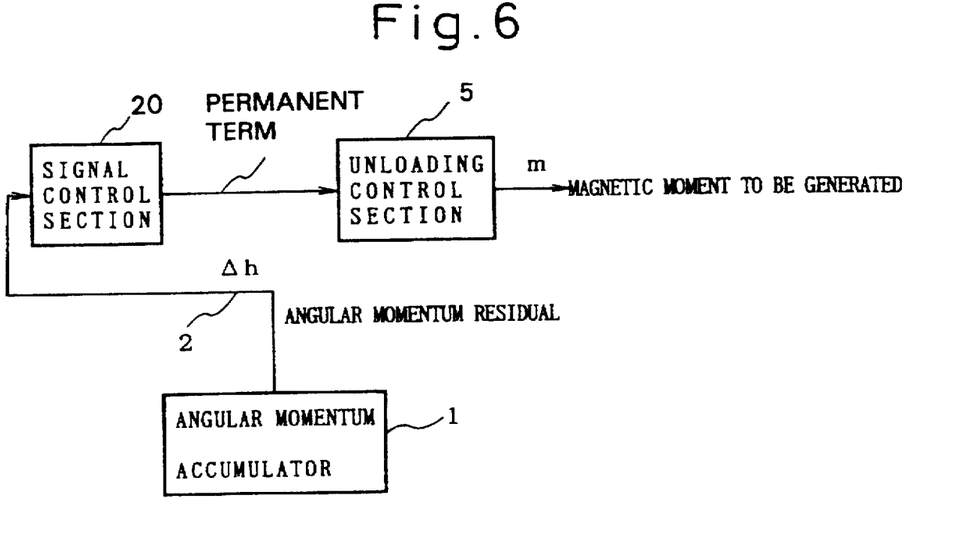
FIG. 6 is a block diagram which shows the magnetic unloading method of the past which considered the permanently increasing term of the angular momentum residual.

In other prior art, as shown in FIG. 6, as the result of the action of environmental disturbance torque, of the angular momentum residual accumulated in the angular momentum accumulator 1, the permanent term, which increases monotonically with respect to the inertial space (the zero-frequency term in the Fourier transform having the orbital period of the satellite as the base) is detected by the signal processing section 20 and, to eliminate this component, the amount of magnetic moment needed to be generated is determined (for example, as disclosed in Japanese Unexamined Patent Publication (KOKAI) S62-58960). In doing this, because the mechanical coordinate system of the spacecraft is used to described the accumulated angular momentum, the permanent term in the inertial space is treated as a term having the same period as the orbit.

In the magnetic unloading method of the past, shown in FIG. 4, because the magnetic moment to be generated is determined based on the amount of angular momentum residual only, with no consideration given to the environmental disturbance torque acting on the spacecraft caused by this angular momentum residual, a problem existed in that the unloading control would be performed even when the environmental disturbance torque was in a direction that reduces the angular momentum residual. Also, because it was not possible to eliminate the component of the angular momentum residual which is parallel to the geomagnetic field, this component remaining, even though it is not necessary to completely eliminate the perpendicular component, because the above-noted environmental disturbance torque is not considered, there was the problem of performing unnecessary elimination of the perpendicular component. For this reason, there was the additional problem that it was not possible to reduced the amount of electrical power required for the elimination of the angular momentum residual.

In the magnetic unloading method of the past shown in FIG. 6, although it was possible to eliminate an angular momentum residual caused by environmental disturbance torque which continually increased with respect to the inertial space, because absolutely no consideration was given to angular momentum residuals which vary periodically, the period being either the orbital period or 1/n times the orbital period (where n is an integer), a problem existed in that the angular momentum accumulator needed to have the capacity to accumulate angular momentum residual which could tolerate the maximum amplitude value obtained by summing these periodic terms.

For this reason, it was necessary to use a large wheel or the like, this resulting in an inevitable increase in hardware weight and increase in power consumption.

SUMMARY OF THE INVENTION

In consideration of the above-noted drawbacks in the prior art, an object of the present invention is to provide a spacecraft and an attitude control method for a spacecraft, in which the amount of angular momentum needed to be generated is detected from the environmental disturbance torque and the angular momentum residual at each individual point in time and magnetic unloading control processing is performed so as to minimize the amount of electrical power required to eliminate the angular momentum residual, thereby enabling a reduction in the size and weight of the angular momentum accumulator itself.

To achieve the above-noted object, the present invention has the following constitutions. The first aspect of the present invention is a spacecraft which includes an attitude control system, this control system having means for angular momentum accumulation, means for detecting the angular momentum residual, a filtering means for predicting the environmental disturbance torque from the above-noted angular momentum residual, means for performing magnetic unloading control, to which are input this angular momentum residual and the predicted environmental disturbance torque, and which outputs a control signal which is required for the generation of magnetic moment in the direction that cancels out this environmental disturbance torque, and means for generating, in response to the control signal output from the above-noted magnetic unloading control means, a magnetic moment in the direction that cancels out the above-noted environmental disturbance torque. The second aspect of the present invention is an attitude control method for a spacecraft, this method having the steps of detecting, from information accumulated in the angular momentum accumulator, the angular momentum residual of the spacecraft and controlling the attitude of the spacecraft by generating a required amount of magnetic moment from a magnetic unloading control means, using this amount of angular momentum residual, in which the environmental disturbance torque is predicted from the above-noted detected angular momentum residual, this angular momentum residual and the predicted environmental disturbance torque information being used to generate an angular momentum in the direction that cancels out the above-noted environmental disturbance torque.

That is, the characteristic technological constitution of the present invention is an attitude control method for a spacecraft which uses a magnetic unloading control law that considers the environmental disturbance torque acting on the spacecraft, an environmental disturbance torque predicting filter which predicts this environmental disturbance torque being employed, and after the environmental disturbance torque has been predicted, information of both the thus-predicted environmental disturbance torque and the angular momentum residual stored in the angular momentum accumulator as in the past are used to determine the magnetic moment to be used in attitude control of the spacecraft, and a spacecraft which has aboard it a system which executes this attitude control method.

Therefore, in an attitude control method for a spacecraft which is mounted aboard the spacecraft, the magnetic unloading only deals with the instantaneous component of the angular momentum residual which is perpendicular to the geomagnetic field.

On the other hand, because the angular momentum residual which is perpendicular to the geomagnetic field is changed by virtue of the environmental disturbance torque in the direction perpendicular to the geomagnetic field, for example, a torquer which forms a magnetic moment generating means is used to establish the amount of magnetic moment to be generated so that there is no increase in the angular momentum residual in the direction that is perpendicular to the geomagnetic field caused by the environmental disturbance torque in the perpendicular direction to the geomagnetic field. It is the above-noted method that is the magnetic unloading method of the present invention.

BRIEF DESCRIPTION OF THE DRAWINGS

FIG. 2 is drawing which shows the operation in the case in which the magnetic unloading method of an embodiment of the present invention is applied to a spacecraft, with FIG. 2(A) showing the variation of the angular momentum residual, and FIG. 2(B) showing accumulated value of the power consumption index.

FIG. 5 is a drawing which shows the operation in the case in which the magnetic unloading method of the past as shown in FIG. 4, is applied to a spacecraft, with FIG. 5(A) showing the variation of the angular momentum residual, and FIG. 5(B) showing accumulated value of the power consumption index.

DETAILED DESCRIPTION OF THE INVENTION

Preferred embodiments of the spacecraft and the attitude control method according to the present invention will be described in detail below, with reference made to the accompanying drawings.

Figure 1:
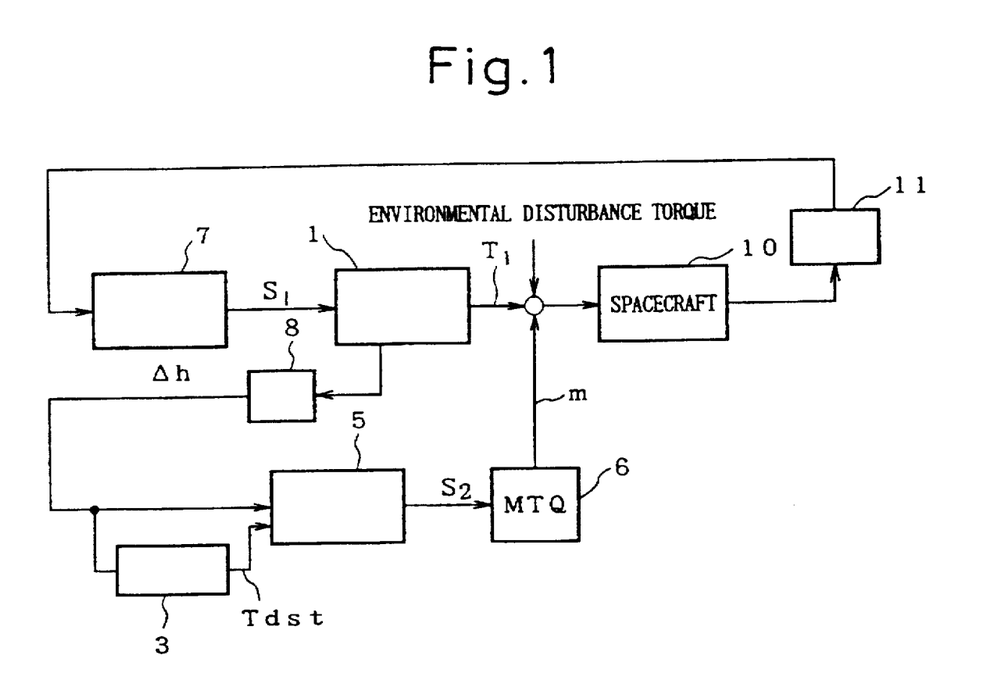
FIG. 1 is a block diagram of the magnetic unloading method of an embodiment of the present invention.

FIG. 1 is a block diagram which illustrates the general system configuration of a system for executing the magnetic unloading method, which is the central technology inherent to the spacecraft attitude control method according to the present invention. The attitude of the spacecraft 10 is detected by the spacecraft attitude sensor 11, this information being sent to an attitude control means 7, which contains the spacecraft attitude control law, a prescribed control signal S1 being output from the attitude control means 7 to the angular momentum accumulator 1, which is formed by a wheel or the like, thereby controlling the rpm of a this wheel or the like, a control torque T1 for the purpose of controlling the attitude of the spacecraft 10 being output from the angular momentum accumulator 1, the spacecraft being controlled based on this torque. Along with this action, the change in the rpm of the wheel or the like of the angular momentum accumulator 1 is detected, the degree of change thereof being used to detect the amount of angular momentum residual Δh via an angular momentum residual detecting means 8, this angular momentum residual Δh being input to a magnetic unloading control means 5, which includes an angular momentum residual control algorithm, and being also input to an environmental disturbance torque filter 3, which includes an algorithm for controlling the angular momentum residual Δh so as to generate a predicted environmental disturbance torque Tdst, this environmental disturbance torque Tdst being input to the above-noted magnetic unloading control means 5, which outputs a control signal S2 to a magnetic moment generating means 6, which is formed by a magnetic torquer or the like, the magnetic moment generating means 6 outputting the amount of magnetic moment m which is required to generate the unloading torque for the purpose of canceling out the above-noted angular momentum residual Δh, this amount of magnetic moment m being specified by the magnetic moment control signal S2.

The environmental disturbance torque Tdst dealt with in the present invention can be envisioned to include torque which reacts with the geomagnetic field in the presence of air resistance, solar radiation, gravitational force, and the torque of the spacecraft generated by a reaction caused between the residual magnetic torque remained in the spacecraft and the geomagnetic field.

In the method of the past, as described earlier, because only the amount of angular momentum residual Δh was monitored, unloading control being performed based on only the variation thereof, it was difficult to perform precise attitude control of a spacecraft, and because it was necessary to increase the capacity and configuration of the magnetic moment generating means, there was an unavoidable increase in power consumption.

While there is no particular limitation place on the environmental disturbance torque predicting filter 3 of the present invention, it is possible to apply a prediction filter algorithm such as that of a Kalman filter, using this to cause output of the predicted environmental disturbance torque Tdst.

In the magnetic unloading control means 5 in the present invention, examples of the controlling equation used in generating the control signal S2 for the purpose of determining the amount of magnetic moment m are the following relationships.

$$m = \frac{(\Delta h \times B)}{(\Delta h \times B) \cdot (\Delta h \times B)} \cdot \beta P \quad (2)$$

$$\beta P = -\frac{1}{B \cdot B} \cdot (\Delta h \times B) \cdot \{(Tdst + \alpha P \Delta h) \times B\} \quad (3)$$

In Equations (2) and (3), αp is a parameter that establishes the unloading control characteristics, and B is the geomagnetic field vector which acts on the spacecraft. The symbol x represents the vector inner product and the symbol x represents the vector outer product. That is, Equations (2) and (3) give the unit vector which indicates the direction in which the magnetic moment is to be generated, and the scalar quantity which indicates the magnitude of the magnetic moment to be generated.

In the above-noted equations, the component of the predicted environmental disturbance torque in the direction perpendicular to the geomagnetic field and the component of the angular momentum residual Δh monitored from the above-noted angular momentum accumulator 1 which is perpendicular to the geomagnetic field are considered, the instantaneous components of each being detected and processed.

FIG. 2 shows an example of operation in the case in which the magnetic unloading method which uses the unloading control laws of the present invention, shown as Equations (2) and (3) is applied to the same spacecraft as in the case of FIG. 5.

Figure 2A:
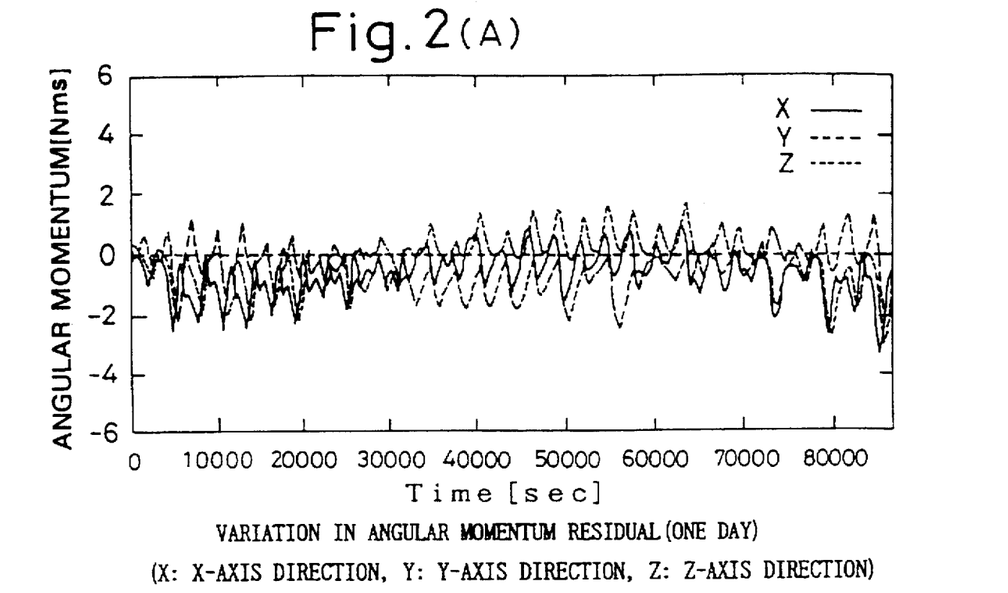
Figure 2B:
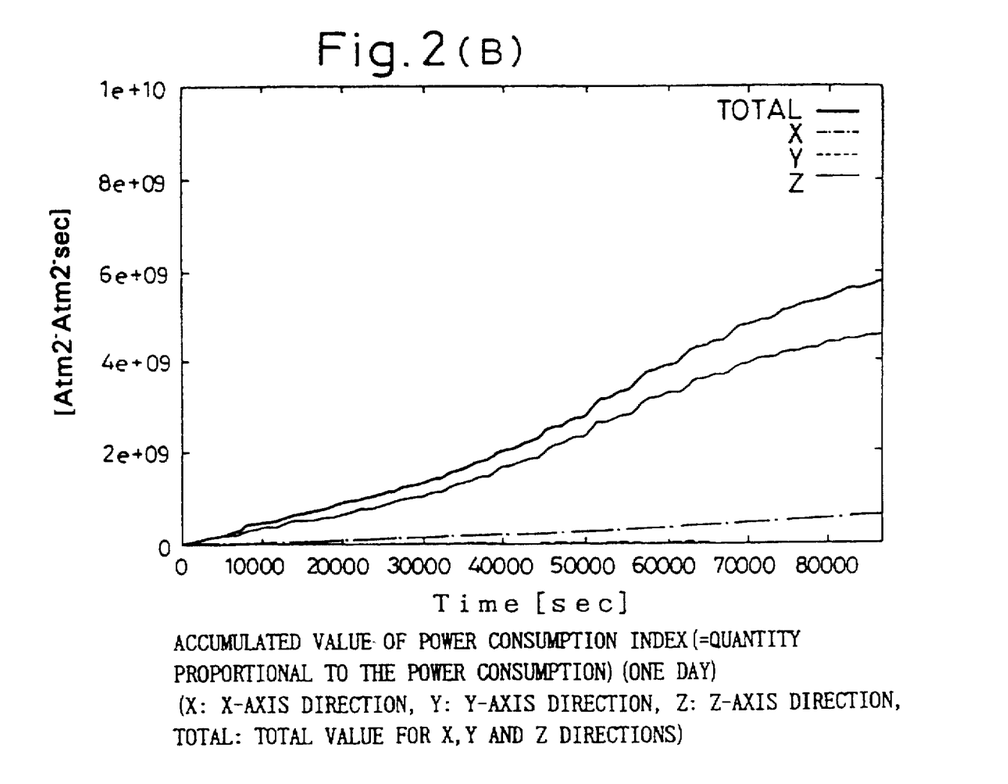

FIG. 2(A) shows the variations in angular momentum residual over a one-day period, and FIGS. 2(B) shows the accumulated value of the power consumption index.

By comparing FIGS. 2(A) and 2(B) with FIGS. 5(A) and 5(B), it can be seen that performance is greatly improved. For example, if the example of operation, shown in FIGS. 2(A) and 2(B) of the magnetic unloading method according to the present invention with the application of the unloading control equations (2) and (3) is compared with the example of operation, shown in FIGS. 5(A) and 5(B) of the magnetic unloading method of the past which uses Equation (1) as the control equation, it can be seen that the maximum angular momentum residual is reduced to approximately one half, and that it is possible to reduce the accumulation capacity of the angular momentum accumulator.

As the result, it is possible to achieve a reduction in size and weight of the angular momentum accumulator. The power consumption can be reduced by approximately 25%, enabling a low-power-consumption design.

A spacecraft according to the present invention is one which includes a magnetic unloading control system such as described above.

More specifically, it is a spacecraft which includes an attitude control system having means for accumulating angular momentum residual 1, means for detecting the angular momentum residual 8, environmental disturbance torque predicting means 3 for predicting the environmental disturbance torque 4 (Tdst) from the above-noted angular momentum residual, means for performing unloading control 5, to which is input the above-noted predicted environmental disturbance torque, and which outputs a control signal S2 required in order to cause generation of a magnetic moment in the direction that cancels this environmental disturbance torque, and magnetic moment generating means 6 for generating a magnetic moment in the direction that cancels the environmental disturbance torque in response to the above-noted control signal S2 which is output from the magnetic unloading control means 5.

In the present invention, the above-noted magnetic moment generating means 6 generates a magnetic moment in at least one of the X-axis, Y-axis, and Z-axis directions, and preferably is configured so as to generate magnetic moment in all of the above-noted axis directions.

Figure 7:
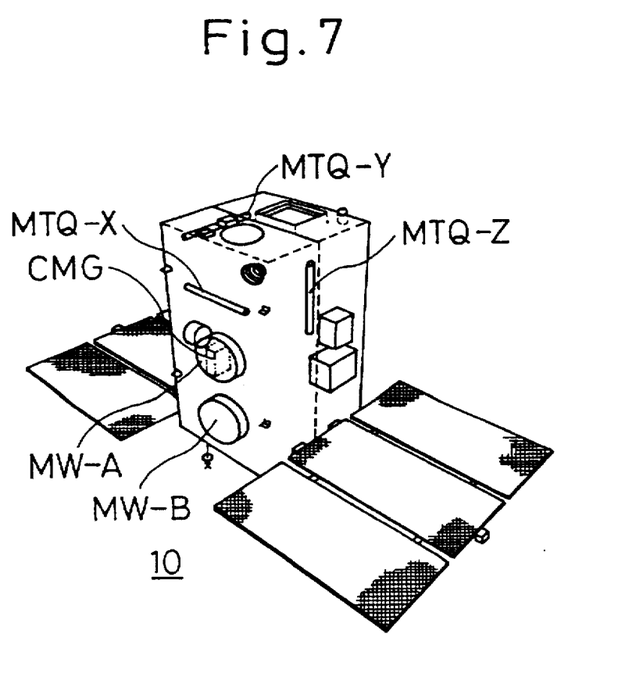
FIG. 7 is a perspective view of an example of the disposition of the angular momentum accumulator 1 and the magnetic moment generating means according to the present invention as used aboard a spacecraft.

FIG. 7 shows an example of the case in which three magnetic torquers (MTQ-X, MTQ-Y, and MTQ-Z) which form magnetic moment generating means 6 are disposed in mutually orthogonal attitudes in a spacecraft according to the present invention, such as the manmade satellite 10. In this example, the momentum wheels (MW-A and MW-B) which form the angular momentum accumulators 1 have provided on them a control momentum gyro (CMG).

The momentum wheels which serve as the magnetic moment generating means 6 can also be provided for each one of the three axes X, Y, and Z, and it is also possible to use one or two momentum wheels, inclining the axes of rotation thereof to a prescribed angle with respect to the X, Y, and Z axes.

The spacecraft attitude control method according to the present invention is spacecraft attitude control method in which, as described above, the angular momentum residual of the spacecraft is detected from information accumulated in the angular momentum accumulator, this angular momentum residual being used to generate a prescribed amount of magnetic moment from a magnetic unloading control means, thereby controlling the attitude of the spacecraft, and in doing so, the environmental disturbance torque is predicted from the detected angular momentum residual and, from the angular momentum residual information and the predicted environmental disturbance torque, a magnetic moment is generated in the direction which cancels out this environmental disturbance torque.

Additionally, a characteristic feature of the spacecraft attitude control method according to the present invention is that the above-noted environmental disturbance torque is detected at each individual point in time, and at each individual point in time the prescribed magnetic moment is generated in the direction to cancel out this thus individually detected environmental disturbance torques.

Furthermore, while the present invention basically performs control with respect to the component of the environmental disturbance torque that is perpendicular to the geomagnetic field, a component of the environmental disturbance torque which was parallel to the geomagnetic field can be accumulated in the above-noted angular momentum accumulator 1, and when, during the circling of the spacecraft 10 in orbit, the environmental disturbance torque becomes perpendicular with respect to the geomagnetic field, the same method as noted above is used to cause generation of a magnetic moment in the direction that cancels out this environmental disturbance torque.

Figure 3:
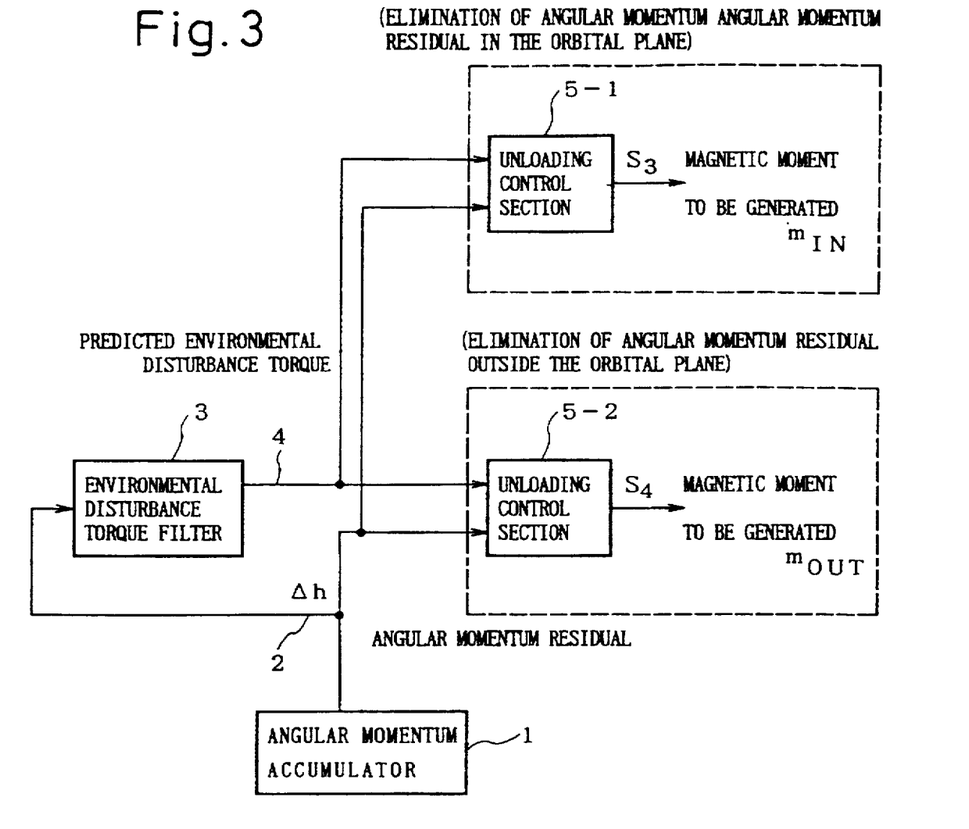
FIG. 3 is a block diagram of the magnetic unloading method of a different embodiment of the present invention.

Next, another example of a spacecraft and a spacecraft attitude control method according to the present invention will be described, with reference being made to FIG. 3.

While in the above-noted example one magnetic unloading control means 5 was used, in this example, a plurality of magnetic unloading control means 5 is used.

In more detail, in the basic configuration of the above-noted spacecraft 10, a plurality of this unloading control means 5 (5-1 and 5-2) is provided, each of these magnetic unloading control means 5-1 and 5-2 individually generating the control signals S3 and S4, which establish the magnetic moments $m_{IN}$ in and $m_{OUT}$ that are to be generated to act in mutually differing directions.

In this example, mutually differing direction can be, for example, a direction within the orbital plane of the spacecraft 10 and a direction which is perpendicular to this orbital plane.

In the method of attitude control for a spacecraft according to the this example of the present invention, the angular momentum residual Δh of the spacecraft 10 is detected from information accumulated in the angular momentum accumulator 1, this angular momentum residual Δh being used to generated the control signal S2 required to cause generation of the prescribed amount of magnetic moment m from the magnetic unloading control means 5, thereby controlling the attitude of the spacecraft 10.

To do this, a plurality of the above-noted unloading control means is provided, the control signals necessary to cause generation from each of these unloading control means of the prescribed amounts of magnetic moment $m_{IN}$ and $m_{OUT}$, these being generated in directions of action which are mutually different, these plurality of magnetic moment $m_{IN}$ and $m_{OUT}$ being used individually or in combination so as to cancel out the environmental disturbance torque in each of the directions of action thereof.

Essentially, in this example of the present invention, a three-dimensional angular momentum residual elimination is performed, in which separate control is performed in a direction within the orbital plane of the spacecraft 10 and in a direction perpendicular to the orbital plane.

While in the above-noted example three-dimensional unloading is performed using three magnetic torquers disposed in a three-dimensional manner, when applying this example in particular to the case in which the spacecraft is a manmade satellite, this spacecraft attitude control method is particularly effective if the satellite is orbiting along a polar orbit which passes over the north and south poles.

That is, as the spacecraft 10 orbits along a polar orbit, because almost all of the geomagnetic field is within the orbital plane, it is more effective to think of the environmental disturbance torque as being divided into a component (two-dimensional) in the orbital plane and a component (one-dimensional) perpendicular to the orbital plane, with control of each of these components being performed individually.

In the above-noted case, because almost all of the geomagnetic field falls within the orbital plane of the spacecraft 10, the torque that should be generated outside the orbital plane, that is, perpendicularly to the orbital plane is expressed as $m_{IN}$ (magnetic moment within the orbital plane )×Bin (geomagnetic field within the orbital plane), the torque that should be generated within the orbital plane being expressed as $m_{OUT}$ (magnetic moment in the direction perpendicular to the orbital plane)×Bin (geomagnetic field within the orbital plane).

As a result, the direction of generation of torque to be used in unloading in accordance with the magnetic moment and the geomagnetic field, that is, the torque Tout which is perpendicular to the orbital plane and the torque Tin which is parallel to the orbital plane are generated in accordance with the factors given in the table below.

|  | Bin (geomagnetic field within the orbital plane) | Bout (geomagnetic field outside the orbital plane) |
| --- | --- | --- |
| $m_{IN}$ | Tout | Tin |
| $m_{OUT}$ | Tin | 0 |

From the above table, it can be seen that if it is desired to control the attitude of a spacecraft 10 in a direction perpendicular to the orbital plane, in the case in which only the geomagnetic field Bin exists in the orbital plane, it is sufficient to cause generation of the magnetic moment within the orbital plane.

In the same manner, it can be seen that if is desired to perform attitude control of the spacecraft 10 in a direction parallel to the orbital plane, in the case in which only the geomagnetic field Bin exists in the orbital plane, it is sufficient to cause only generation of the magnetic moment $m_{OUT}$ outside of the orbital plane.

Therefore, while it is possible to perform these two control operations independently, it is possible to use an appropriate combination of these control operations to execute the desired magnetic unloading control.

It is possible to use the same kind of equations in calculating the magnetic moments $m_{IN}$ and $m_{OUT}$ in this example as presented earlier as Equations (2) and (3).

That is, in this example of the present invention, it is possible, for example to supply a prescribed current to two magnetic torquers, thereby causing them to generate the magnetic moment $m_{IN}$, with a prescribed current being supplied to the remaining magnetic torquer to cause it to generate the magnetic moment $m_{OUT}$.

As described above, the magnetic unloading control in the present invention is based on instantaneous execution, and for this reason and therefore requires two magnetic torquers. However, as described above, since the geomagnetic field changes as seen from the spacecraft 10, by waiting to perform magnetic unloading control until the change occurs, and in this case it is only necessary to have one magnetic torquer.

As described above, the magnetic unloading method according to the present invention has an environmental disturbance torque filter and a unloading control section which establishes the amount of magnetic moment to be generated from the predicted environmental disturbance torque and the angular momentum residual, thereby enabling a reduction in electrical power required to eliminate the angular momentum residual and enabling a reduction is size and weight of the wheel or the like which serves as an angular momentum accumulator.

Additionally, by reducing the power consumption for elimination of the angular momentum residual, it is also possible to reduce the size and weight of solar battery paddles and batteries used to generate and store electrical energy in the spacecraft.

What is claimed is:

1. A spacecraft which includes aboard it an attitude control system, this attitude control system comprising:

means for accumulating angular momentum residual;

means for detecting angular momentum residual;

a filtering means for performing environmental disturbance torque prediction filtering, which predicts an environmental disturbance torque from said angular momentum residual;

means for performing magnetic unloading control, to which is input said angular momentum residual and said predicted environmental disturbance torque, and which outputs a control signal required for the generation of a magnetic moment in a direction than cancels out said environmental disturbance torque; and means for generating a magnetic moment, which generates, in response to said control signal output from said magnetic unloading control means, a magnetic moment in a direction that cancels out said environmental disturbance torque.

2. A spacecraft according to claim 1, wherein said magnetic moment generating means generates a magnetic moment in at least one of the axis directions X, Y, and Z.

3. A spacecraft according to claim 1, wherein a plurality of said magnetic unloading control means is provided, each of said magnetic unloading control means individually generating a control signal that establishes an amount of magnetic moment to be generated in one of a plurality of direction of actions, said directions of action being mutually different.

4. A spacecraft according to claim 3, wherein said plurality of directions of action comprise a direction within the orbital plane of said spacecraft and a direction perpendicular to said orbital plane.

5. A spacecraft attitude control method comprising the steps of:

detecting, from information accumulated in an angular momentum accumulator, the angular momentum residual of the spacecraft;

using said angular momentum residual to output a control signal required to output from a magnetic unloading control a prescribed amount of magnetic moment;

controlling the attitude of the spacecraft by generating said prescribed amount of magnetic moment;

predicting an environmental disturbance torque from said output angular momentum residual; and generating a magnetic moment in a direction so as to cancel out said environmental disturbance torque by means of said angular momentum residual information and said predicted environmental disturbance torque.

6. A spacecraft attitude control method according to claim 5, wherein substantially only a magnetic moment is generated so as to cancel out that component of said environmental disturbance torque which is perpendicular to the geomagnetic field.

7. A spacecraft attitude control method according to claim 5, wherein, each time a prescribed amount of time has elapsed, a component of said environmental disturbance torque which is parallel to the geomagnetic field is canceled out by generating a magnetic moment in a direction than cancels a component of said environmental disturbance torque which is parallel to the geomagnetic field.

8. A spacecraft attitude control method according to claim 5, wherein a prescribed magnetic moment is caused to be generated at each specific time in a direction so as to cancel out the environmental disturbance torque detected at that time.

9. A spacecraft attitude control method according to claim 5, wherein magnetic moments of plurality of mutually different directions action are caused to be generated from a plurality of unloading control means, at least one of these magnetic moments being used to cause it to act so as to cancel out the environmental disturbance torque in the direction of action thereof.

10. A spacecraft attitude control method according to claim 9, wherein the directions of action comprise a direction which is within the orbital plane of the spacecraft and a direction which is perpendicular to the orbital plane.

11. A spacecraft attitude control method according to claim 9, wherein said environmental disturbance torque is detected at each individual time, a prescribed magnetic moment being caused to be generated in a direction so as to cancel out this detected environmental disturbance torque.

12. A spacecraft attitude control method according to claim 6, wherein a prescribed magnetic moment is caused to be generated at each specific time in a direction so as to cancel out the environment disturbance torque detected at that time.

13. A spacecraft attitude control method according to claim 7, wherein a prescribed magnetic moment is caused to be generated at each specific time in a direction so as to cancel out the environment disturbance torque detected at that time.

14. A spacecraft attitude control method according to claim 6, wherein magnetic moments of plurality of mutually different directions action are caused to be generated from a plurality of unloading control means, at least one of these magnetic moments being used to cause it to act so as to cancel out the environmental disturbance torque in the direction of action thereof.

15. A spacecraft attitude control method according to claim 7, wherein magnetic moments of plurality of mutually different directions action are caused to be generated from a plurality of unloading control means, at least one of these magnetic moments being used to cause it to act so as to cancel out the environmental disturbance torque in the direction of action thereof.

16. A spacecraft attitude control method according to claim 14, wherein the directions of action comprise a direction which is within the orbital plane of the spacecraft and a direction which is perpendicular to the orbital plane.

17. A spacecraft attitude control method according to claim 15, wherein the directions of action comprise a direction which is within the orbital plane of the spacecraft and a direction which is perpendicular to the orbital plane.

18. A spacecraft attitude control method according to claim 14, wherein said environmental disturbance torque is detected at each individual time, a prescribed magnetic moment being caused to be generated in a direction so as to cancel out this detected environmental disturbance torque.

19. A spacecraft attitude control method according to claim 15, wherein said environmental disturbance torque is detected at each individual time, a prescribed magnetic moment being caused to be generated in a direction so as to cancel out this detected environmental disturbance torque.

* * * * *